Nov. 30, 1965  J. E. LINDBERG  3,221,128
HERMETICALLY SEALED PRESSURE ACTUATED SPOT
POINT TEMPERATURE DETECTION DEVICE
Filed Oct. 10, 1962

INVENTOR.
JOHN E. LINDBERG
BY
Owen, Wickersham & Erickson

United States Patent Office
3,221,128
Patented Nov. 30, 1965

3,221,128
HERMETICALLY SEALED PRESSURE ACTUATED SPOT POINT TEMPERATURE DETECTION DEVICE
John E. Lindberg, Alamo, Calif.
(1211 Upper Happy Valley Road, Lafayette, Calif.)
Filed Oct. 10, 1962, Ser. No. 229,530
11 Claims. (Cl. 200—140)

This invention relates to a temperature detection device for use in detecting a critical temperature at a spot point.

The invention in this application is related to that in my co-pending application Serial No. 86,252 filed January 26, 1961, now abandoned, and also to that in my co-pending application Serial No. 102,622 filed April 10, 1961, now abandoned, both of those cases being continuations-in-part of application Serial No. 815,406 filed May 25, 1959, now Patent No. 3,122,728. The earlier applications were directed principally to a continuous type of fire detector having an element which was normally from two to thirty feet long. This sensing element could detect critical temperatures at spot points along the line or could also detect the over-all average temperature along the line. In contrast, the present invention is designed solely for detection of the critical temperature at a particular point or very small area. It employs a pressure switch or responder generally like that in Serial No. 86,252 but having a particular structure adapted to the needs of spot-point detection.

Among the objects of the invention are the detection of a critical temperature at a spot point, the provision of an apparatus for spot point temperaure detection which is rugged and reliable and able to withstand considerable heat and apparatus in which the detection is accomplished by other than electrical means which actuates a device to operate an electrical circuit external to the detection zone.

Other objects and advantages of the invention will appear from the following description of some preferred forms thereof.

Figure 1:
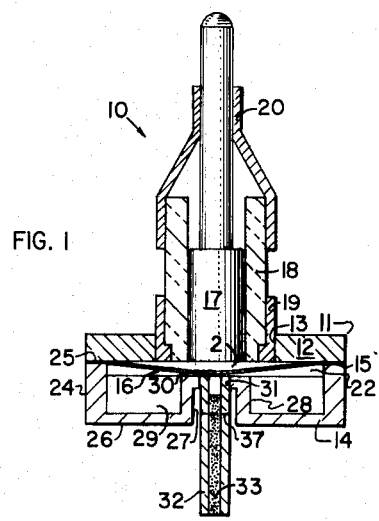
FIG. 1 is a view in elevation and in section of a temperature detecting device embodying the principles of the invention. The diaphragm is shown in its unactuated position, and a tubular portion used in manufacture is shown as it appears before completion of the device, where it is cut off along a broken line shown in the drawing.

The detector unit 10 shown in FIG. 1 incorporates a housing 11 comprising an upper flat metal annulus 12 having an opening 13 therethrough, a lower configurated short cylindrical body member 14 and a diaphragm 15. All three are preferably made of the same metal, preferably molybdenum or kovar, and are brazed together so that they are all in electrical connection with each other and so that the diaphragm divides one side from the other. The diaphragm 15 is preferably provided with a spherical segment or a blister 16 of the metal stretched beyond its elastic limit and is normally not in contact with an electrode 17. The electrode 17 is insulated from the metal annulus 12 by a ceramic tube 18, which is brazed to a stepped metal tube 19 that is brazed to the annulus 12 in the opening 13. The lower surfaces of all of the members 12, 18, and 19 are coplanar, and electrode 17 extends very slightly (e.g. 0.00175") lower. A cap 20 seals the end of the ceramic tube 18 to the electrode 17 and assures a sealed chamber 21 on the upper side of the diaphragm 15. When the gas pressure in a sealed chamber 22 on the lower side of the diaphragm 15 increases enough to force the blister 16 up flat into contact with the electrode 17, a suitable warning circuit is actuated, or, in other words, the blister 16 and electrode 17 are the elements of a pressure-actuated electrical switch.

The lower body member 14 has a cylindrical side wall 24 with a shoulder 25 sealed to the diaphragm 15. A bottom wall 26 is annular, around a recess 27, and a small cylindrical portion 28 extends back toward the diaphragm 15, but short of it, and provides an enlarged annular cavity 29 therearound, forming part of the chamber 22. A central portion 30 has an opening 31 to which a short tube 32 is brazed. The chamber 22 in the device of FIG. 1 is charged with a suitable gas at a suitable pressure. One of the noble gases, such as argon, may be used, or a gas such as hydrogen or other suitable gases may be used. Preferably the gas is inert with respect to the metal involved in the housing 11 and diaphragm 15. The gas is filled through the tube 32, which is then heat sealed by fusing a brazing wire 33, the brazing being done at a high temperature. The formation of the recess 27 and the pre-brazing of the tube 32 enables all the seals to be made at a very high temperature, so that the housing 11 will not come apart or lose its seal when exposed to temperatures in the neighborhood of 2000° F., and it also enables the device to be brazed and sealed without conducting unduly high-temperature heat to other parts of the device. The tube 32 is then cut off at 37 to lie above the bottom 26.

The chamber 21 may also be precharged with gas, if desired, or it may be left as a vacuum, if desired, or may be left at atmospheric pressure, if desired. Any of these expedients may be used.

Figure 2:
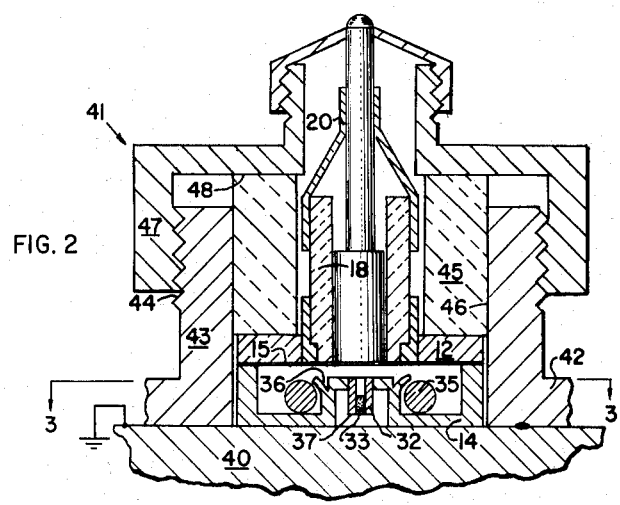
FIG. 2 is a view similar to FIG. 1 of an installation of a modified form of the invention, with the diaphragm shown in its actuated position.
Figure 4:
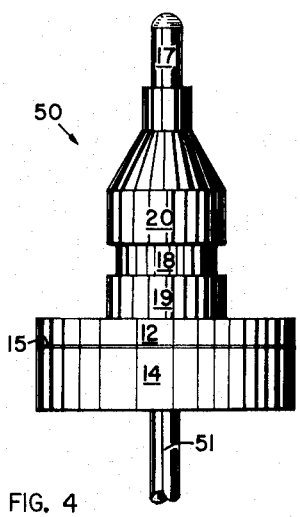
FIG. 4 is a view in elevation, partly in section, of another modified form of the invention, with a portion thereof broken in the middle in order to conserve space.
Figure 3:
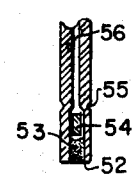
FIG. 3 is a view in section taken along the line 3—3 in FIG. 2.
Figure 3:
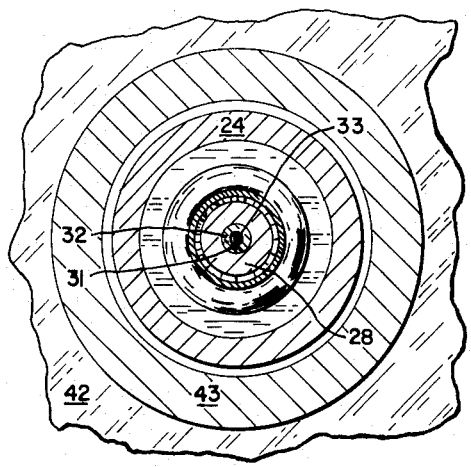

A modified form of the invention is shown in FIGS. 2 and 3. Here the device is substantially the same as that of FIG. 1 except that a ring 35 of a metal wire (such as titanium, zirconium, or palladium) ingassed with hydrogen (or, if desired, some equivalent such as chunks of metal hydride) is disposed in the ring-like cavity 29 and is held there (against possible contact with the diaphragm 15 upon inversion of the device) as by staking 36. This enables adjustment to a higher temperature and enables a triggering at a predetermined temperature.

As also shown in FIGS. 2 and 3, the device may be mounted on an electrically grounded metal surface 40 by the use of a mounting assembly 41 comprising a base member 42 which is spot welded to the surface 40 and which has a tubular portion 43 within which the responder 10 fits and which has exterior threads 44. A spacer 45 of insulating material is inserted inside the central opening 46 of the member 42, and bears on the upper plate 12 of the device 10. Then, the spacer 45 is clamped down on the plate 12 by a cap-like tubular member 47 which is threaded on the threads 44 and has a shoulder 48 bearing on the spacer 45. This holds the bottom 26 of the spot-detector device in firm electrical contact with the metal surface 40.

Another modified form of unit 50 is like the unit 10 except that in place of the short tube 32 cut off at 37, a longer tube 51 (which may be several feet long) is provided, sealed at its outer end 52 by a brazing wire insert 53. Adjacent this outer end 52 a short length of metal hydride 54 (e.g., titanium, zirconium, or palladium hydride) is positioned, being held there as by crimping a portion 55. The tube lumen 56 is preferably very small in diameter, capillary in nature, and is evacuated so that only release of hydrogen from the hydride 54 can build up gas pressure that can actuate the diaphragm 15. This point detector 50 enables the diaphragm to be more remote from the point whose temperature is being observed than in the device 10.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A temperature responsive switch for detecting a critical temperature at a particular small area, including in combination:
   a housing having an upper portion and a lower portion,
   said lower portion having a pair of tubluar walls, namely an outer wall and a shorter inner wall spaced apart and joined together by a lower wall,
   a diaphragm sandwiched between and sealed to the upper end of said outer wall and said upper portion, said diaphragm having a portion that is normally concave on the side facing said upper housing member and convex on the side facing said lower housing member,
   a tube having its upper end sealed to the upper end of said inner wall and means sealing closed the lower end of said tube to provide a sealed chamber below said diaphragm and extending down therefrom, and
   an electrode supported by and insulated from said upper portion for contact with said diaphragm when the pressure in said sealed chamber below said diaphragm flexes said diaphragm.

2. The switch of claim 1 wherein said tube stops short of the level of said lower wall and said lower wall rests on said small area.

3. The switch of claim 2 wherein a ring of metal hydride is retained in said lower portion between said inner and outer walls.

4. The switch of claim 1 wherein said tube extends below said lower wall and has a capillary lumen and has near its lower end a short charge of metal hydride.

5. A temperature responsive switch for detecting a critical temperature at a particular small area, including in combination:
   a housing having an upper portion and a lower portion,
   said lower portion having a pair of tubular walls, namely an outer wall and a shorter inner wall spaced apart and joined together by a lower generally annular wall that is adapted to rest on said small area, an annular rim extending in adjacent the upper end of said inner wall,
   a diaphragm sandwiched between and sealed to the upper end of said outer wall and said upper portion, said diaphragm having a central portion that is normally concave on the side facing said upper housing member and convex on the side facing said lower housing member,
   a tube sealed to said rim of said inner wall and extending down short of said lower wall and a length of brazing wire sealing the lower end of said tube to provide a sealed chamber below said diaphragm and extending down therefrom, and
   an electrode supported by and insulated from said upper portion for contact with said diaphragm when the pressure in said sealed chamber below said diaphragm flexes said diaphragm.

6. The switch of claim 5 having a ring of metal hydride in said housing between said inner and outer wall.

7. A temperature responsive switch for detecting a critical temperature at a particular small area, including in combination:
   an upper housing member having a flat lower surface with a first central opening,
   a lower housing member having a continuous outer wall extending lengthwise and having at its upper end a continuous shelf facing said flat surface of said upper housing member, a continuous inner wall parallel to said outer wall but stopping below said shelf and defining a second central opening, a continuous lower wall joining said inner and outer wall and adapted to rest on said small area,
   a diaphragm sandwiched between and sealed to said shelf and a rim portion of said upper housing member opposite said shelf, said diaphragm having a central portion that is normally concave on the side facing said upper housing member and convex on the side facing said lower housing member,
   a tube filling said second central opening and sealed closed to provide a sealed chamber below said diaphragm,
   an electrode in said first central opening, having a lower end flush with said flat lower surface,
   means insulating said electrode from said upper housing member, and
   means sealing said electrode, insulating means, and upper housing to provide a sealed chamber above said diaphragm.

8. A temperature responsive switch for detecting a critical temperature at a particular small area, including in combination:
   an upper housing member having a flat lower annular surface with a first central opening,
   a lower housing member having a cylindrical outer wall having at an upper end a continuous annular shelf facing an outer rim portion of said flat surface of said upper housing member, a cylindrical inner wall coaxial with said outer wall but having its upper end lying below said shelf and having an annular inner rim defining a second central opening, a continuous lower wall joining said inner and outer wall,
   a diaphragm sandwiched between and sealed to said shelf and an outer portion of the flat surface of said upper housing member opposite said shelf, said diaphragm having a central portion that is normally concave on the side facing said upper housing member and convex on the side facing said lower housing member,
   a tube in said second central opening and sealed to said inner rim and having its lower end closed to provide a sealed chamber below said diaphragm,
   an electrode in said first central opening, having a lower end flush with said flat lower surface,
   means insulating said electrode from said upper housing member, and
   means sealing said electrode, insulating means, and upper housing to provide a sealed chamber above said diaphragm.

9. The switch of claim 8 wherein said tube is shorter than said inner wall.

10. The switch of claim 9 wherein a ring of metal hydride is disposed in said chamber between said inner and outer walls.

11. The switch of claim 8 wherein said tube is capillary and is longer than said inner wall and extends a substantial distance beyond said lower wall, and has a charge of metal hydride adjacent its closed end.

References Cited by the Examiner

UNITED STATES PATENTS 2,381,582   8/1945   Erickson _____ 200—83

FOREIGN PATENTS 11,393   5/1913   Great Britain.

BERNARD A. GILHEANY, *Primary Examiner.*

ROBERT K. SCHAEFER, *Examiner.*